United States Patent [19]

Sing

[11] Patent Number: 4,756,087
[45] Date of Patent: Jul. 12, 1988

[54] COMPACT MEASURING DEVICE

[76] Inventor: Peter Sing, 43 Donny Brook Rd., Scarsdale, N.Y. 10583

[21] Appl. No.: 9,365

[22] Filed: Jan. 30, 1987

[51] Int. Cl.⁴ .............................................. G01B 3/10
[52] U.S. Cl. ........................................ 33/138; 242/107
[58] Field of Search ............... 242/107, 107.2; 33/138, 33/137, 1 LE

[56] References Cited

U.S. PATENT DOCUMENTS

| | | | |
|---|---|---|---|
| 3,120,059 | 2/1964 | Quenot | 33/138 X |
| 3,255,531 | 6/1966 | Anderson | 33/138 |
| 4,142,693 | 3/1979 | Czerwinski | 33/138 X |
| 4,402,472 | 9/1983 | Burtscher | 242/107 X |
| 4,527,334 | 7/1985 | Jones et al. | 242/107 X |

OTHER PUBLICATIONS

K & E Publication, "Albadine", 1954.

Primary Examiner—William D. Martin, Jr.
Attorney, Agent, or Firm—Nathaniel Altman

[57] ABSTRACT

A compact extra-length tape measuring device with capacity for four hundred foot measurement, sized so that no dimesion exceeds six inches, uses a narrow thin tape suitably marked with measuring indicia and held to be unwound and rewound on a space-saving offset storage spool. Rotation of the spool during tape withdrawal tightens a coiled flat spring through a gear reduction drive; the tape, when released, is automatically rewound on the spool by action of the unwinding spring. A lock-release mechanism and a tape-viewing magnifying window also may be provided.

11 Claims, 1 Drawing Sheet

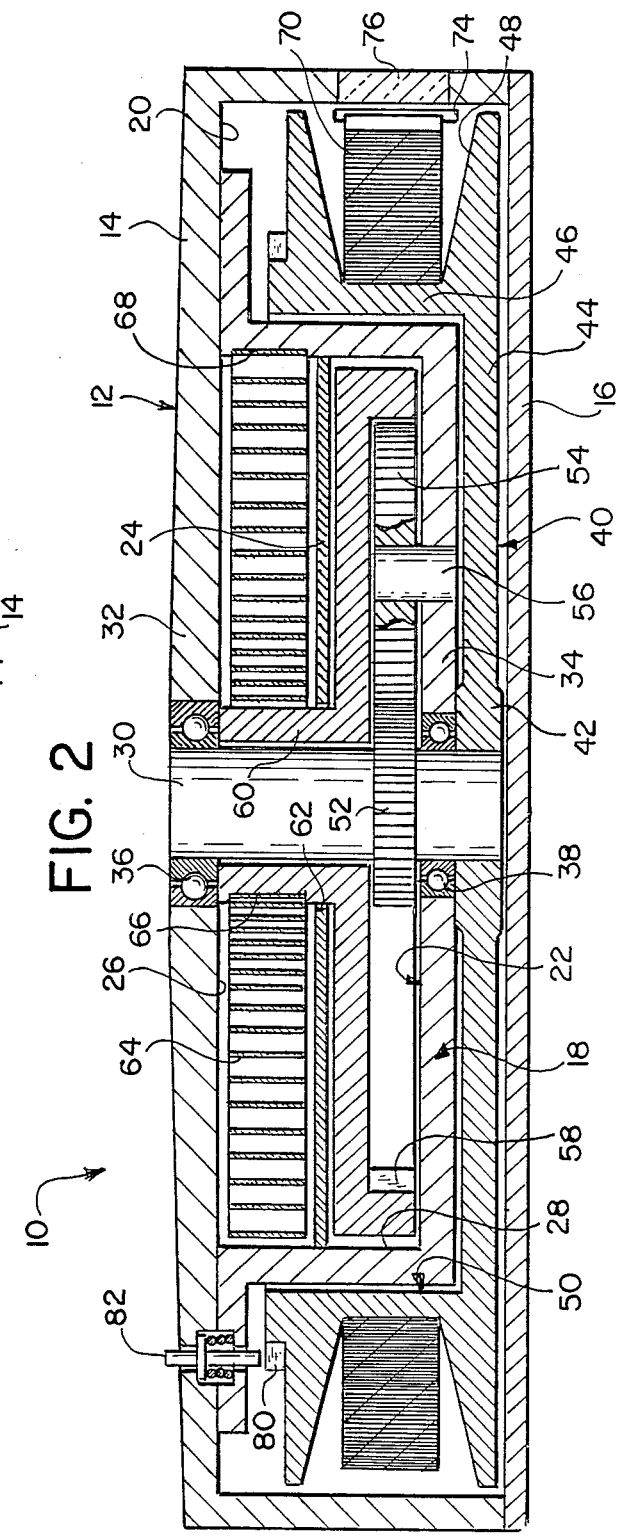

COMPACT MEASURING DEVICE

BACKGROUND OF THE INVENTION

Conventional tape measures which provide tape lengths of more than 10 or 12 feet tend to be bulky and cumbersome, heavy to carry and awkward to use. In most versions, a handle is supplied for laborious hand-rewinding of the tape after a measurement has been taken.

To overcome these tape measure drawbacks and deficiencies, it is the principal object of this invention to provide a lightweight compact tape measure device with a measuring capacity of up to 400 feet, which includes an automatic rewind mechanism and which is sized to be easily carried in the palm of the hand or in a pocket.

SUMMARY OF THE INVENTION

The tape measure device of this invention utilizes a narrow thin tape wound on a storage spool which is offset with respect to its hub for space- and weight-saving efficiency. The storage spool is mounted on, and for rotation with, a main shaft which is journalled in the housing of the measuring device. Also mounted for rotation on and with the main shaft is a small gear, part of a gear reduction drive for minimizing the number of turns necessary for winding an energy-storing return coil spring during tape withdrawal, and for the spring's rewinding the tape after a measurement.

A magnifying lens window may be mounted on the device's housing for easy reading of the scale indicia on the tape during a measurement. Also included may be a lock-release mechanism for maintaining the device in a tape-extended position against the urging of the return spring until a measurement is completed.

Full details of the novel elements of this invention will be described in connection with the accompanying illustrative drawings, wherein:

SHORT FIGURE DESCRIPTION OF THE DRAWINGS

FIG. 1 is a perspective view of a preferred embodiment of a tape measure according to this invention; and FIG. 2 is a sectional view taken along line 2—2 of FIG. 1.

DESCRIPTION OF THE PREFERRED EMBODIMENT

The tape measure device generally designated 10 is shown substantially contained in cylindrical housing 12, which comprises cup-shaped casing 14 and flat circular cover plate 16, together forming the outer shell of measuring device 10. Within housing 12 a flanged cup-shaped frame member 18 is fixed to inner face 20 of casing 14, providing an inner space 22 subdivided by partition 24 into compartments 26 and 28.

A centrally disposed main shaft 30 extends transversely across casing 14 and is journalled rotatably in wall 32 of casing 14 and wall 34 of frame member 18 by means of bearings 36 and 38, respectively. One end of shaft 30 carries for rotation therewith tape storage spool 40, which is also substantially cup-shaped; its hub 42 and single wall 44 extending outwardly therefrom form the circular base of the cup, while the cup's cylindrical end wall is represented by peripheral wall 46, with tape-storing circumferential groove 48 centrally disposed in the surface of wall 46. In this way, a cylindrical space 50, defined by walls 44 and 46, is provided to accommodate a substantial portion of frame member 18 projecting from wall 32 of casing 14; tape-storing rim groove 48 of spool 40 is offset with respect to its hub 42; and device 10 achieves an eminently compact space- and weight-saving configuration.

Small gear 52, mounted for rotation with storage spool 40 on main shaft 30, is positioned to mesh with intermediate idler gear 54, which is freely rotatable on stub shaft 56 fixed in wall 34 of frame member 18. In operative engagement with idler gear 54 is planetary gear 58, the hub 60 of which is mounted for free rotation on main shaft 30. As seen in FIG. 2, gears 52, 54 and 58 are substantially contained in compartment 28, and together constitute a gear reduction drive. Hub 60 of gear 58 projects through central opening 62 in partition 24 into compartment 26, which is substantially occupied by coiled flat returned spring 64, end 66 of which is anchored in hub 60, the other end 68 being attached to frame member 18.

Measuring tape 70 in stored position is wound in circumferential rim groove 48 of spool 40, with the free end 72 of tape 70 outside housing 12. To use, tape 70 is withdrawn from housing 12 by pulling free end 72 of tape 70, which passes through slot opening 74 in casing 14's end wall. Adjacent to slot 74, magnifying lens window 76 is mounted in casing 14, so that, as tape 70 is withdrawn, the measuring scale indicia 78 on its surface may be read easily. The unwinding of tape 70 causes spool 40 to rotate, and consequently shaft 30 and gear 52 with it; gear 52 turns idler gear 54, which in turn causes both planetary gear 58 and its hub 60 to rotate, and spring 64 to be tightened, thus storing energy. The gear reduction drive comprising gears 52, 54 and 58 makes possible the use of a smaller coiled flat spring 64 with relatively few spring turns required to power the relatively many turns of rewinding spool 40.

With tape 70 extended to the desired length being measured, a reading may be taken through magnifying lens window 76. If desired, tape 70 may be locked in its extended position by a stoprelease mechanism such as is shown in FIG. 2, wherein a toothed collar 80 projecting from cylindrical wall 46 of spool 40 may be engaged by depressing flanged spring-biased pin 82 mounted in housing 12, thus locking device 10 by preventing rotation and rewinding. When pin 82, or free tape end 72, is released, spring 64 uses its stored energy to unwind and thus to rotate hub 60, gears 58, 54 and 52, shaft 30 and spool 40 in the direction opposite to that of tape withdrawal, causing tape 70 to be rewound on spool 40 and restoring tape measure device 10 to its original starting position.

It should be noted that the beast mode of practising this invention requires that device 10 be made as small, compact and lightweight as possible in order to combine extra-length capacity with modest size and convenient handling. For this purpose, tape 70 may be fabricated from metal, fabric or suitably polymeric film in lengths up to 400 feet, and in widths in the range of 2–10 mm., with the lower end of this range preferred, even though it necessitates magnification of scale indicia 78 for comfortable easy reading. With respect to the overall size of tape measure device 10, its housing 12, which obviously may be modified to a shape other than cylindrical, is no larger than 6 inches in diameter, or any dimension, and no greater than 0.5 inches in thickness.

Various modifications or substitutions in the elements of this invention may suggest themselves or be evident to those skilled in the art which may be made without departing from the invention's essential spirit or scope. For example, in addition to the above-mentioned optional housing shape, lock-release mechanism 80–82 may be replaced by conventional ratchet-and-pawl or similar construction, and bearings 36,38 replaced by bushings or the like. The concepts of this invention are defined and limited only by the accompanying claims.

What is claimed is:

1. Compact measuring device which comprises:

tape means up to 400 feet in length and of a width in the range of 2-10 mm., said tape having suitable measurement scale indicia along its length;

a housing for containing the measuring device, said housing comprising:

an outer cup-shaped housing member;

an inner cup-shaped housing member having a circumferential flange extending outwardly from its open end and positioned oppositely to and within said outer housing member, said flange being affixed to said outer housing member on its base wall, said opposed housing members thereby forming an inner chamber therebetween; and a cover to be positioned on the open end of said outer housing member to enclose the compact measuring device;

a shaft centrally disposed, transversely positioned and rotatably journalled in both said members of said housing, said shaft extending through said inner chamber;

cup-shaped spool means for said tape means to be unwound and rewound thereon, said spool means being mounted on and for rotation with said shaft, being positioned adjacent said inner housing member outside said inner chamber and having its tape-storing end wall portion offset with respect to its hub mounted on said shaft so that said offset end wall portion concentrically overlies and substantially surrounds said inner housing member and substantially occupies the space between the circumferential end wall of said inner housing member and the circumferential end wall of said outer housing member; and means for returning and rewinding said tape means on said spool means, said return and rewind means being mounted operatively on said shaft and being positioned within and substantially occupying said inner chamber.

2. Compact measuring device in accordance with claim 1, wherein said tape means is made of metal.

3. Compact tape measure device as defined in claim 1, wherein said tape means is in the range of from 2 to 4 mm. in width, and which further comprises magnifying means for viewing said scale indicia on said tape means, said magnifying means being mounted in said housing adjacent a slot in said housing through which said tape means is withdrawn from and returned to said spool means.

4. Compact measuring device in accordance with claim 1, wherein said substantially cup-shaped spool means comprises:

said hub for mounting said spool means on said shaft;

a circular side wall attached to and extending radially outwardly from said hub;

said offset end wall portion of said spool means being attached to the circumferential rim of said circular side wall and extending perpendicularly outwardly therefrom to overlie radially said inner housing member, said end wall portion having a circumferential outer groove centrally disposed therein, said groove being offset with respect to said hub means and being adapted to store said tape means.

5. Compact tape measure device as defined in claim 1, wherein said housing is cylindrical.

6. Compact tape measure device as defined by claim 1, wherein said returning and rewinding means comprises resilient means attached both to said housing and to said gear reduction drive, said resilient means being adapted to store energy when said tape means is unwound from said spool means and to rewind said tape means back onto said spool means when said tape means is released.

7. Compact tape measure device as defined by claim 6, wherein said resilient means is a coiled flat spring.

8. Compact tape measure device as defined by claim 1, further comprising means for selectively locking and releasing the compact tape measure device when said tape means is in an unwound extended position.

9. Compact measuring device in accordance with claim 6, wherein said returning and rewinding means further comprises a gear reduction drive to permit rewinding relatively large lengths of said tape means on said spool means with relatively few turns of said resilient means, said gear reduction means being operatively connected to and actuated by the rotation of said shaft.

10. Compact measuring device in accordance with claim 2, wherein said tape means is made of fabric.

11. Compact measuring device in accordance with claim 1, wherein said tape means is made of polymeric film.

* * * * *